April 4, 1961     T. S. SIMMS     2,977,675
METHODS OF MAKING COPPER-ALUMINUM JOINTS
Filed July 23, 1956
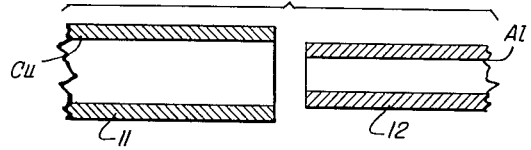
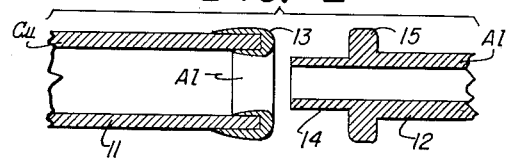
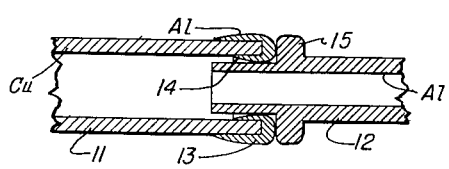
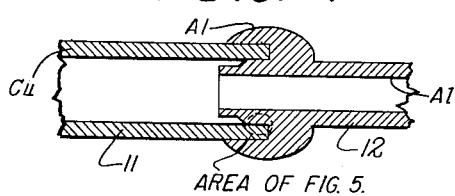
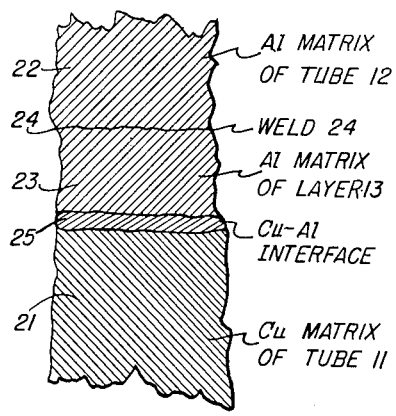
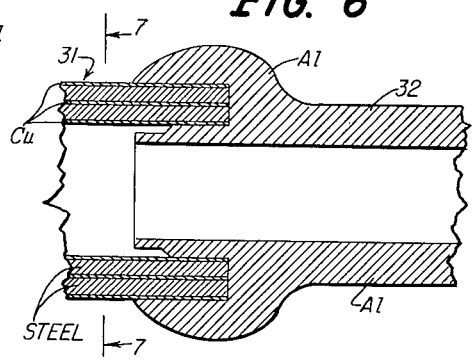
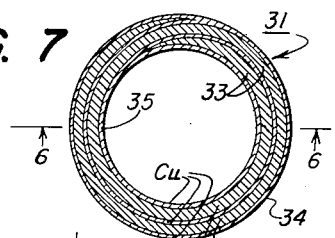
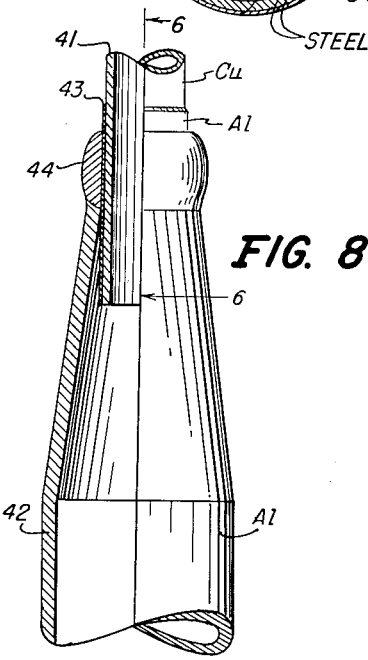
INVENTOR.
Thomas S. Simms
BY
Smith, Olsen, Baird & Miller,
Attys.

United States Patent Office 2,977,675
Patented Apr. 4, 1961

2,977,675

METHODS OF MAKING COPPER-ALUMINUM JOINTS

Thomas S. Simms, Bensenville, Ill., assignor to General Electric Company, a corporation of New York Filed July 23, 1956, Ser. No. 599,442

7 Claims. (Cl. 29—479)

The present invention relates to methods of uniting or joining a copper or copper base alloy body to an aluminum or aluminum base alloy body, and more particularly to methods of producing gas-tight joints between two tubes formed of the dissimilar metals noted.

In an hermetically sealed refrigerating machine of the compressor-condenser-evaporator type, it is conventional practice to connect a suction line formed of copper to an accumulator or header formed of aluminum employing a two-section connector that includes a copper section joined to an aluminum section, the copper section in turn being joined to the suction line, and the aluminum section in turn being joined to the header; whereby this composite connection between the suction line and the header comprises the three tandem related joints noted; and of course each of the three joints mentioned must be completely gas-tight.

In the conventional manufacturing method, the two sections of the connector are first joined together at a location remote from the assembly line, and then the composite connectors thus produced are brought to the assembly line. At the assembly line, the copper and aluminum sections of the connector are respectively joined to the copper suction line and to the aluminum header by the production of the two corresponding joints.

While this manufacturing method is expensive to carry out, it has been absolutely necessary heretofore as the production of a satisfactory gas-tight joint directly between the copper suction line and the aluminum header on the assembly line has been entirely unfeasible, due to the notorious difficulty encountered in perfecting such a joint between these two dissimilar metals.

On the other hand, at the location remote from the assembly line, the two-section connectors may be produced with great care and thoroughly tested, whereby only those connectors that are tested as being entirely satisfactory are brought to the assembly line to be incorporated into the refrigerating machines. In the production of the connectors, elaborate precautions are taken in preparing, cleaning, fluxing, silver-soldering, etc., the two sections thereof, so as to obtain a satisfactory gas-tight joint therebetween; and notwithstanding these precautions, the percentage of connectors found to be defective upon testing may be quite large.

Accordingly, it is a general object of the present invention to provide an improved method of making a strong, gas-tight and entirely satisfactory joint between a copper or copper base alloy tube and an aluminum or aluminum base alloy tube, in a simple and ready manner, whereby a direct joint between the copper suction line and the aluminum header in an hermetically sealed refrigerating machine may be produced on the assembly line in which such refrigerating machines are manufactured.

Another object of the invention is to provide an improved method of joining or uniting a body formed of copper or a copper base alloy and a body formed of aluminum or an aluminum base alloy.

A further object of the invention is to provide an improved and economical method of producing joints between tubing respectively formed of the two dissimilar metals noted.

Further features of the invention pertain to the particular arrangement of the steps of the method, whereby the above-outlined and additional operating features thereof are attained.

The invention, both as to its organization and method of operation, together with further objects and advantages thereof, will best be understood by reference to the following specification taken in connection with the accompanying drawing, in which:

Figure 1 illustrates in longitudinal section a copper tube and an aluminum tube that are to be joined together at the adjacent ends thereof in accordance with the method of the present invention;

Fig. 2 is a view similar to Fig. 1, illustrating the copper tube after an aluminum layer has been applied to the end thereof, and illustrating the aluminum tube after the end thereof has been upset;

Fig. 3 is a view similar to Fig. 2, illustrating the tubes after a frictional fit or joint has been produced between the adjacent ends thereof;

Fig. 4 is a view similar to Fig. 3, illustrating the completed joint between the tubes;

Fig. 5 is a greatly enlarged sectional view representing a photomicrograph of an area of the joint between the tubes, as indicated in Fig. 4;

Fig. 6 illustrates in longitudinal section a steel-copper or "Bundy" tube and an aluminum tube that have been joined together at the adjacent ends thereof in accordance with the method of the present invention;

Fig. 7 is a cross-sectional view of the Bundy tube, taken in the direction of the arrows along the line 7—7 in Fig. 6; and Fig. 8 is an enlarged side elevational view, partly in longitudinal section, of a joint between a copper suction line and an aluminum header in a refrigerating machine that has been made in accordance with the method of the present invention.

Referring now to Figs. 1 to 4, inclusive, there are illustrated two tubes 11 and 12, the adjacent ends of which are to be joined together to provide a gas-tight connection therebetween, the tube 11 being formed of copper or a suitable copper base alloy, and the tube 12 being formed of aluminum, or a suitable aluminum base alloy. Actually the tubes 11 and 12 comprise portions of a refrigerating machine of the compressor-condenser-evaporator type arranged on an assembly line for producing such refrigerating machines, the tube 11 comprising the end of the suction line of the refrigerating machine, and the tube 12 comprising the end of the accumulator or header of the refrigerating machine.

In accordance with the present method, the tubes 11 and 12 are to be joined or united directly to each other and while they are connected to the other cooperating portions of the refrigerating machine on the assembly line. In carrying out the present method, the outer end of the tube 11 is first prepared by cleaning therefrom any oil, grease, dirt, etc., in any suitable manner; then the outer end of the tube 11 is dipped into a slurry of any suitable aluminum fluxing compound, such, for example, as Alcoa No. 33 aluminum fluxing compound, so as to render the surface thereof oxide-free. After appropriate fluxing of the outer end of the tube 11, the same is dipped into a bath of molten aluminum so as to wet and to produce a layer 13 of aluminum upon the extreme outer end thereof, as shown in Fig. 2, the layer 13 being ring-shaped and covering the extreme outer end of the tube 11 as well as the adjacent interior and exterior cylindrical end surfaces thereof. In this step, the temperature of the bath of molten aluminum should be controlled in the general range 1250° F. to 1400° F.; and the aluminized layer 13 having a thickness of about 0.003" is produced merely by dipping the prepared end of the tube 11 into the bath of molten aluminum followed by immediate withdrawal thereof from the bath of molten aluminum.

The outer end of the tube 12 is prepared by cold-working the same in a suitable dieset; whereby the extreme outer end of the tube 12 is upset so as to produce the tubular projection 14 thereon that is surrounded by the annular shoulder 15, as shown in Fig. 2.

The ends of the tubes 11 and 12 are then fitted together, as shown in Fig. 3; whereby the tubular projection 14 carried on the extreme outer end of the tube 12 projects into the throat of the aluminum layer 13 carried on the extreme outer end of the tube 11. In the arrangement, the external diameter of the tubular projection 14 is slightly larger than the internal diameter of the throat of the ring-like layer 13 so that a self-supporting frictional fit or joint is produced upon the insertion of the tubular projection 14 into the throat of the ring-like layer 13. The positions of the ends of the tubes 11 and 12 are established upon the production of the frictional joint, as shown in Fig. 3, by the abutment between the end portion of the layer 13 carried by the tube 11 and the adjacent annular shoulder 15 carried by the tube 12.

This assembly is then transferred to a conventional heliarc welding machine that comprises the usual tungsten welding electrode and the usual inert gas supply tube. In the operation of the heliarc welding machine, an arc is struck from the tungsten welding electrode to the junction between the aluminum parts 13 and 15 and an inert gas (preferably argon) is supplied into the area of the arc so as to shield the arc and the melt against oxidation. Relative rotation is produced between the tungsten welding electrode and the parts 13 and 15 so that the engaging parts 13 and 15 are melted and welded together while they are protected against oxidation in the inert atmosphere of argon. The particular inert gas utilized in the heliarc machine is not important and frequently helium is employed instead of argon. Upon cooling and resolidification of the melt the gas-tight joint between the tubes 11 and 12 is produced, as illustrated in Fig. 4.

Turning now to Fig. 5, there is represented diagrammatically a photomicrograph of the joint between the tubes 11 and 12 in the area indicated in Fig. 4; whereby this section of the joint comprises the copper matrix of the tube 11 (indicated at 21), the aluminum matrix of the tube 12 (indicated at 22), the aluminum matrix of the layer 13 (indicated at 23), the weld between the matrices 22 and 23 (indicated at 24) and the copper-aluminum interface between the matrices 21 and 23 (indicated at 25). The material of the interface 25 disposed between the copper matrix 21 of the tube 11 and the aluminum matrix 23 of the layer 13 comprises a copper-aluminum alloy representing an excellent metallurgical bond between the matrices 21 and 23. In the actual photomicrograph, the interface 25 is represented by a definite band of color distinct from that of the matrices 21 and 23; and likewise, in the actual photomicrograph, the weld 24 is represented by an exceedingly thin line of color distinct from that of the matrices 22 and 23.

Of course, the joint between the tubes 11 and 12 is entirely satisfactory and is completely gas-tight with respect to the refrigerant that is sealed within the refrigerating machine; and in passing, it is noted that such refrigerant normally comprises a suitable Freon, such as Freon F12, etc.

Recapitulating: it will be appreciated that the method of the present invention is simple and economical to carry out so that it may be performed on the assembly line in which the refrigerating machines are being manufactured, whereby it is feasible directly to join the copper suction line 11 to the aluminum header 12, without the usual intervening copper-aluminum connector. Thus, in accordance with the method, there is only one joint in the refrigerating machine between the suction line 11 and the header 12; whereas, in the conventional construction, there are really three joints between the suction line 11 and the header 12, as previously explained. Hence, the present method is highly advantageous in the manufacture of refrigerating machines.

Turning now to Figs. 6 and 7, a modified construction is illustrated that comprises a joint that has been produced between the tubes 31 and 32 in accordance with the present method. More particularly, in this arrangement, the suction line 31 is constructed of so-called "Bundy" tubing, while the accumulator or header 32 is constructed of the usual aluminum tubing. As best illustrated in Fig. 7, the conventional Bundy tubing 31 comprises a core 33 formed of steel and sandwiched between respective outer and inner layers 34 and 35 formed of copper. Specifically, in the production of the Bundy tubing 31, the outer and inner copper layers 34 and 35 are suitably applied to the steel core 33 to produce a composite sheet; and then the composite sheet is rolled upon a suitable mandrel, or the like, to produce the tight spiral formation, wherein the ends of the composite sheet are lapped, so that the wall thickness of the Bundy tubing 31 comprises a minimum of two layers of the core 33. Ultimately the assembly is transferred to a brazing furnace and suitably heated in order that the copper layers 34 and 35 are brazed together to provide a unitary construction that is very strong and gas-tight.

As previously noted, frequently the suction conduit 31 in a refrigerating machine is formed of Bundy tubing, whereby it is necessary to produce a joint between the end of the Bundy tubing 31 and the adjacent end of the aluminum tube 32. In order to produce the joint mentioned, and illustrated in Fig. 6, in accordance with the present invention, the steps previously described are carried out in the manner previously explained, since both the outer and inner surfaces of the Bundy tube 31 are in fact formed of copper. In this connection, it is pointed out that when the layer of aluminum is applied to the end of the Bundy tube 31 by dipping in the bath of molten aluminum it normally has a thickness of about 0.0015", instead of a thickness of about 0.003" as in the case of the copper tube 11. This small variation or characteristic is inherent in the dipping of the Bundy tube 31 in the bath of molten aluminum and represents no departure in the method with respect to the dipping step. The subsequent welding of the aluminized layer provided on the extreme outer end of the Bundy tube 31 and the adjacent end of the aluminum tube 32 is the same as that previously described, whereby the joint of Fig. 6 is produced.

This modification of the method of the present invention is simple and economical to carry out so that it may be performed on the assembly line in which the refrigerating machines are being manufactured; whereby it is feasible directly to join the Bundy suction line 31 to the aluminum header 32, without the usual intervening copper-aluminum connector. Thus, in accordance with the present method, there is only one joint in the refrigerating machine between the suction line 31 and the header 32; whereas, in the conventional construction, there are really three joints therebetween, as previously explained.

Referring now to Fig. 8, a modified construction is illustrated that comprises a joint that has been produced between the copper suction line 41 and the aluminum header 42 in a refrigerating machine, in accordance with the present method. More particularly, in the production of this joint, the extreme outer end of the suction line 41 is appropriately cleaned and dipped into the bath of molten aluminum so as to provide, upon withdrawal thereof, the layer of aluminum, indicated at 43. Then the end of the suction line 41 is inserted into the opening provided in the adjacent end of the header or accumulator 42; and thereafter the weld is perfected between the extreme outer end of the header 42 and the adjacent aluminum layer 43, as indicated at 44, utilizing the heliarc welding machine, in the manner previously explained.

This modification of the method of the present invention is simple and economical to carry out so that it may be performed on the assembly line in which the refrigerating machines are being manufactured; whereby it is feasible directly to join the copper suction line 41 to the aluminum header 42, without the usual intervening copper-aluminum connector, as previously explained.

In the foregoing description of the present method the suction lines or tubes 11, 31 and 41 have been described as being formed of copper or comprising copper; whereas, in fact, these tubes frequently comprise the conventional copper base alloys, such as brass, etc. Similarly, the headers 12, 32 and 42 have been described as being formed of aluminum or comprising aluminum; whereas, in fact, these headers frequently comprise the conventional aluminum base alloys, such as 2S, etc. These variations impose no limitations upon the present method that is applicable to the joining of copper and copper base alloys to aluminum and aluminum base alloys over an exceedingly wide range of compositions. Accordingly, hereinafter in the claims, the reference to a body or tube formed essentially of copper is intended to embrace such an element when it is formed entirely of copper or of the usual copper base alloys; and likewise, the reference to a body or tube formed essentially of aluminum is intended to embrace such an element when it is formed entirely of aluminum or of the usual aluminum base alloys.

In view of the foregoing, it is apparent that there has been provided an improved method of uniting or joining copper and aluminum bodies, tubes, etc., that lends itself particularly well to the production of joints between tubes formed of such dissimilar materials in the production of refrigerating machines upon an assembly line.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of uniting a first tube having the surfaces thereof formed essentially of copper and a second tube formed essentially of aluminum to form a mechanically strong and gas-tight connection therebetween, which comprises preparing the inside and the outside surfaces of the end of the first tube by cleaning and fluxing the same so as to render them substantially oxide-free, bonding a layer of aluminum onto the prepared inside and outside surfaces of the end of the first tube by immersing the same in a bath of molten aluminum, upsetting the end of the second tube so as to provide a tubular projection thereon surrounded by an adjacent annular shoulder, producing a frictional fit between the ends of the two tubes by inserting the tubular projection into the end of the first tube and so that the tubular projection is in engagement with the interior surface of the layer and so that the annular shoulder is in engagement with the end surface of the layer, and welding both the tubular projection and the annular shoulder to the layer completely to surround and to embed the inside and outside surfaces of the end of the first tube in aluminum to provide a mechanically strong and gas-tight joint between the two tubes.

2. The method of uniting a first tube of the Bundy type including a steel core and copper surface coatings and a second tube formed essentially of aluminum to form a mechanically strong and gas-tight connection therebetween, which comprises preparing the inside and the outside surfaces of the core and the coatings at the end of the first tube by cleaning and fluxing the same so as to render them substantially oxide-free, bonding a layer of aluminum onto the prepared inside and outside surfaces of the core and the coatings at the end of the first tube by immersing the same in a bath of molten aluminum, upsetting the end of the second tube so as to provide a tubular projection thereon surrounded by an adjacent annular shoulder, producing a frictional fit between the ends of the two tubes by inserting the tubular projection into the end of the first tube and so that the tubular projection is in engagement with the interior surface of the layer and so that the annular shoulder is in engagement with the end surface of the layer, and welding both the tubular projection and the annular shoulder to the layer completely to surround and to embed the inside and outside surfaces of the end of the first tube in aluminum to provide a mechanically strong and gas-tight joint between the two tubes.

3. The method of uniting a first tube having the surfaces thereof formed essentially of copper and a second tube formed essentially of aluminum to form a mechanically strong and gas-tight connection therebetween, which comprises preparing the inside and the outside surfaces of the end of the first tube by cleaning and fluxing the same so as to render them substantially oxide-free, bonding a layer of aluminum onto the prepared inside and outside surfaces of the end of the first tube by immersing the same in a bath of molten aluminum, upsetting the end of the second tube so as to provide a tubular projection thereon having an adjacent annular shoulder, producing a frictional fit between the end of the two tubes by inserting one tube into the end of the other tube and so that the tubular projection is in engagement with one surface of the layer and so that the annular shoulder is in engagement with the end surface of the layer, and welding the tubular projection and the annular shoulder to the layer completely to surround and to embed the inside and outside surfaces of the end of the first tube in aluminum to provide a mechanically strong and gas-tight joint between the two tubes.

4. The method set forth in claim 3, wherein the temperature of the bath of molten aluminum is in the general range 1250° to 1400° F.

5. The method set forth in claim 3, wherein the layer of aluminum bonded to the copper surfaces of the first tube has a thickness in the general range 0.0015 to 0.003 inch.

6. The method set forth in claim 3, wherein the aluminum surface of the second tube and the aluminum layer bonded to the copper surfaces of the first tube are welded together by an electric arc while they are enveloped in an inert atmosphere to prevent oxidation thereof.

7. The method of producing a mechanically strong and gas-tight joint between the suction line and the header in a refrigerating machine, wherein the suction line constitutes a first tube having the inside and the outside surfaces thereof formed essentially of copper and the header constitutes a second tube formed essentially of aluminum, which comprises preparing the inside and the outside surfaces of the end of the first tube by cleaning and fluxing the same so as to render them substantially oxide-free, bonding a layer of aluminum onto the prepared inside and outside surfaces of the end of the first tube by immersing the same in a bath of molten aluminum, upsetting the end of the second tube so as to provide a tubular projection thereon having an annular shoulder, producing a frictional fit between the ends of the two tubes by inserting one tube into the end of the other tube and so that the tubular projection is in engagement with one surface of the layer and so that the annular shoulder is in engagement with the end surface of the layer, and welding both the tubular projection and the annular shoulder to the layer completely to surround and to embed the inside and outside surfaces of the end of the first tube in aluminum to provide a mechanically strong and gas-tight joint between the two tubes.

(References on following page)

References Cited in the file of this patent

UNITED STATES PATENTS

| | | | |
|---|---|---|---|
| 1,236,145 | Burns | Aug. 7, | 1917 |
| 1,716,195 | Stockstrom | June 4, | 1929 |
| 2,239,018 | Rogerson | Apr. 22, | 1941 |
| 2,396,730 | Whitfield et al. | Mar. 19, | 1946 |
| 2,544,670 | Grange et al. | Mar. 13, | 1951 |
| 2,659,966 | Turnbull | Nov. 23, | 1953 |
| 2,686,354 | Lundin | Aug. 17, | 1954 |
| 2,769,231 | Grenell | Nov. 6, | 1956 |
| 2,774,686 | Hodge | Dec. 18, | 1956 |
| 2,790,656 | Cook | Apr. 30, | 1957 |
| 2,823,933 | Hickman et al. | Feb. 18, | 1958 |